Patented May 11, 1943

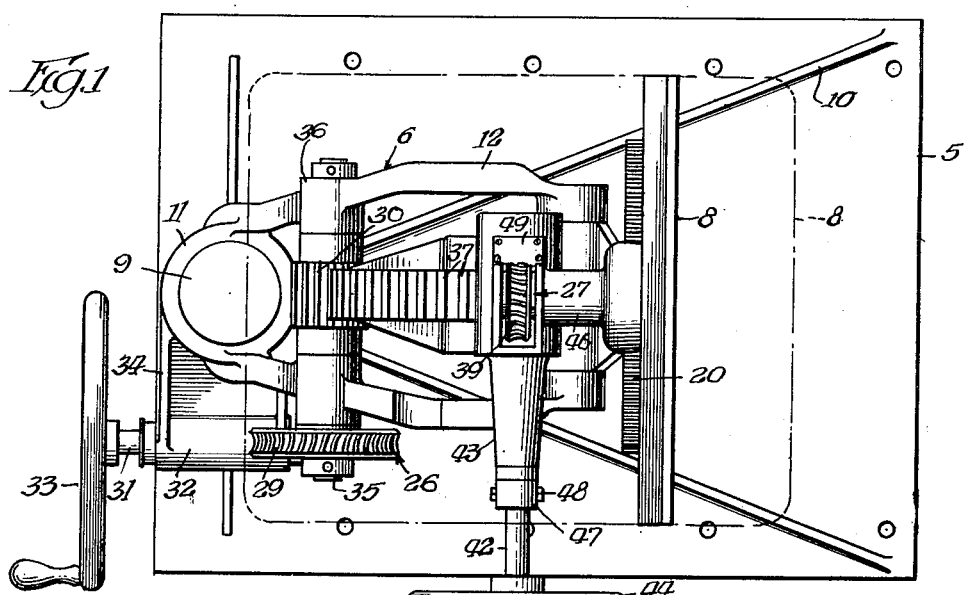
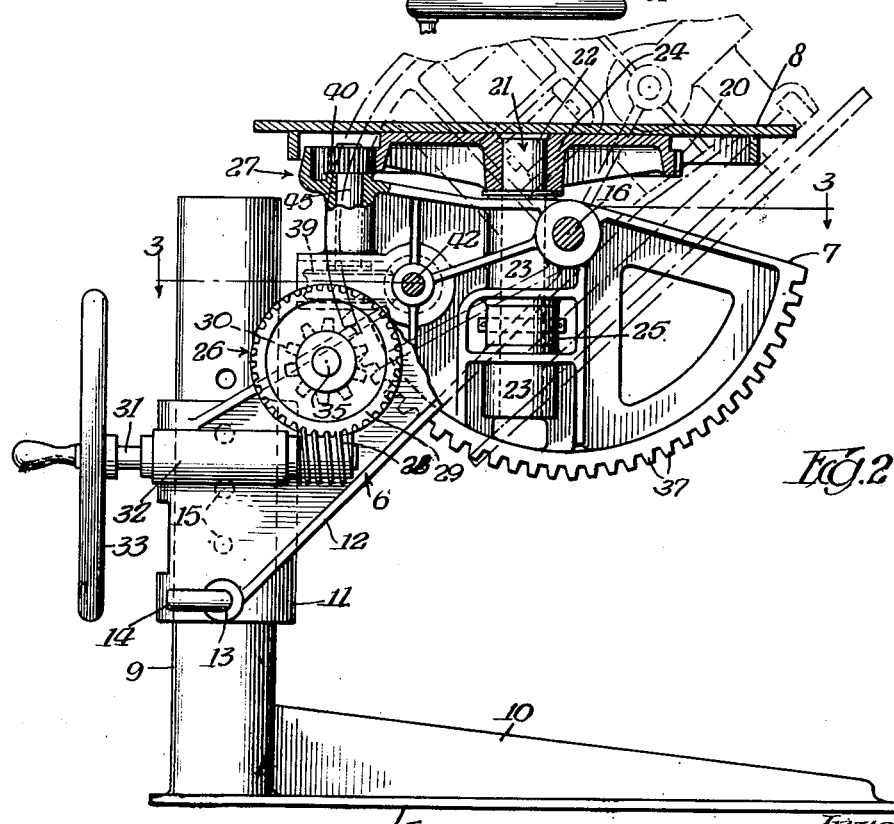

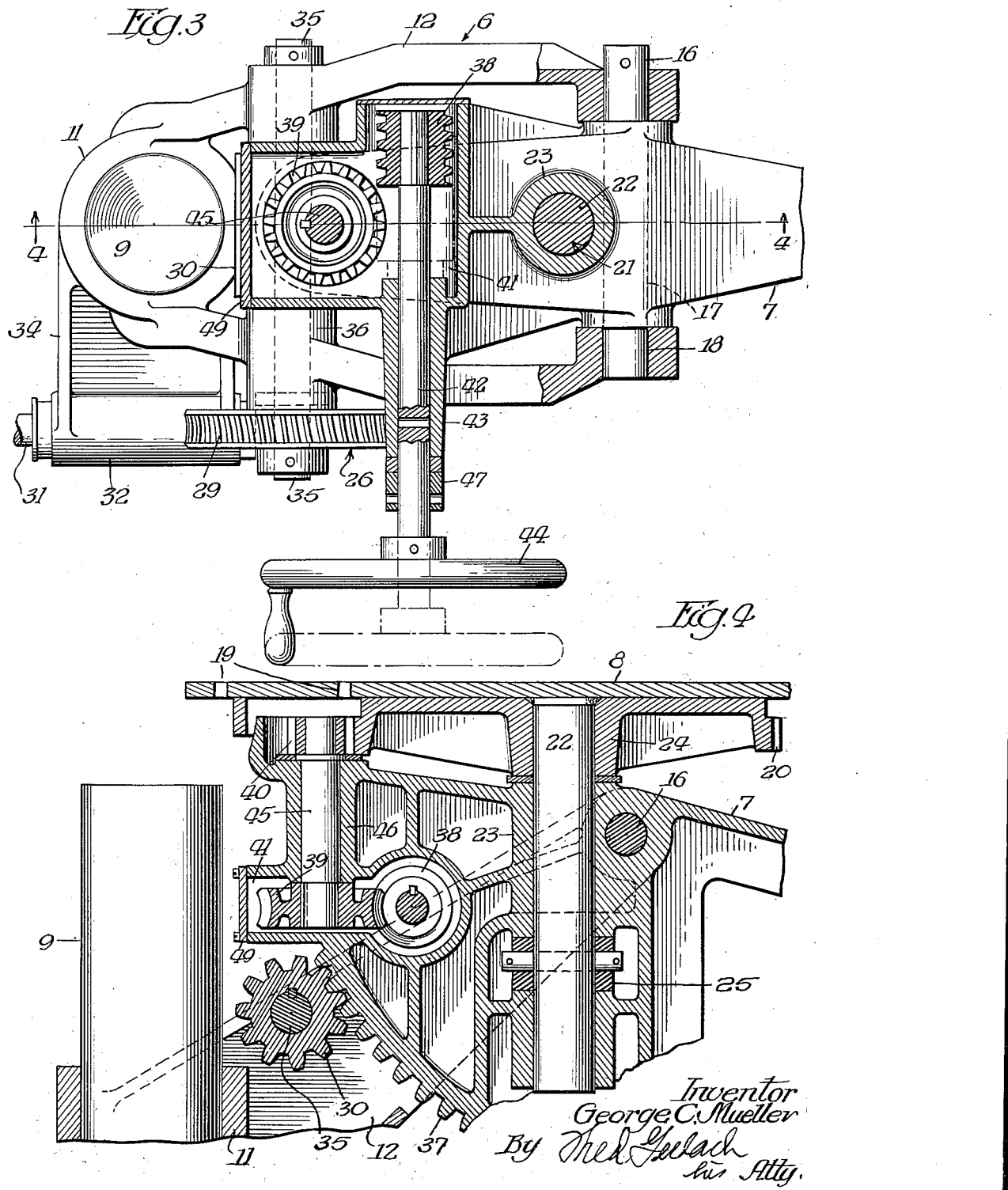

2,318,791

UNITED STATES PATENT OFFICE 2,318,791

WORK POSITIONER

George C. Mueller, Chicago, Ill., assignor to Cullen-Friestedt Company, Chicago, Ill., a corporation of Illinois Application March 4, 1940, Serial No. 322,083

6 Claims. (Cl. 29—89)

The present invention relates generally to work positioners. More particularly the invention relates to that type of positioner which is designed primarily to hold metallic structural pieces or other work in different positions in connection with electric welding thereof and comprises a supporting structure and in addition a work supporting table which is carried by the structure so that it is rotatable about its own center and is also capable of being tilted bodily into different angular positions.

One object of the invention is to provide a work positioner of this type which is an improvement upon, and more efficient than, previously designed positioners of the same general character and has greater capabilities of use as well as certain inherent advantages thereover.

Another object of the invention is to provide a work positioner of the last mentioned type which includes novel gearing for tilting the sector shaped member and table relatively to the bracket and also includes simple and novel gearing for rotating the table relatively to the sector shaped member.

A further object of the invention is to provide a work positioner of the type and character under consideration in which the gearing for rotating the work supporting table relatively to the sector shaped member is of the irreversible type and includes a pair of normally meshing gears, one of which is shiftable out of mesh with the other in order to free the table so that it may be rotated manually, i. e., independently of the gearing.

A still further object of the invention is to provide a work positioner which is generally of new and improved design and not only may be manufactured at a low and reasonable cost but also is compact and durable.

Other objects of the invention and the various advantages and characteristics of the present work positioner will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a plan view showing a work positioner embodying the invention, with the table thereof in a substantially vertical position;

Figure 2 is a side elevation, certain parts of the positioner being broken away and other parts being shown in section for illustrative purposes;

Figure 3 is an enlarged horizontal section taken on the line 3—3 of Figure 2 and illustrating in detail the manner in which one of the gears of the gearing for rotating the table relatively to the sector shaped member is adapted to be disengaged from the gear with which it normally is in mesh in order to free the table so that it may be turned by hand, i. e., independently of such gearing; and Figure 4 is a vertical section taken on the line 4—4 of Figure 3 and further illustrating the construction and design of the irreversible gearing for rotating the work supporting table.

The positioner which is shown in the drawings constitutes or represents the preferred embodiment of the invention. It is primarily designed for holding in different angular positions metallic structural pieces or other work in connection with electric welding thereof, and as its main parts comprises a base 5, a bracket 6, a sector shaped member 7 and a work supporting table 8. The base, bracket and sector shaped member together form or constitute a supporting structure whereby the work table 8 is mounted or carried so that it is capable of being tilted angularly to a limited extent and also rotated about its center.

The base 5 is preferably in the form of a one-piece casting and is adapted to rest upon and be bolted or otherwise fixedly secured to the floor of the room or enclosure in which the positioner is used. It is rectangular as shown in Figures 1 and 2, and embodies at one end thereof an integral vertically extending cylindrical standard 9. The latter is positioned midway between the side edges of the base and is reinforced by way of a pair of upstanding webs 10.

The bracket 6 is vertically adjustable and is disposed over the central portion of the base 5. It is preferably formed of a one-piece casting and consists of a cylindrical sleeve part 11 and a pair of laterally spaced arms 12. The sleeve part fits around and is vertically adjustable on the standard 9 of the base 5. It embodies a pair of diametrically opposite holes 13 in its lower end and is releasably secured in the various positions into which it is shifted or adjusted by means of a key 14 and a vertical series of holes 15 in the central portion of the standard 9. The key 14 normally extends through the holes 13 and one of the holes 15 and thus locks the bracket 6 against vertical and rotative movement relatively to the standard and base. When it is desired to adjust the bracket 6 vertically it is only necessary to remove the key 14 and then raise or lower the bracket to the desired height or elevation. After shift of the bracket to the desired height it is raised or lowered until the holes 13 register with one of the holes 15. As soon as this is accomplished the key 14 is slid back into place so as to lock the bracket 6 in its new position with respect to the standard. The arms 12 of the bracket 6 extend upwardly and outwardly at an angle of approximately 45° with respect to the horizontal. They are slightly upwardly divergent and have the lower or inner ends thereof joined to the opposite side portions of the sleeve part 11.

The sector shaped member 7 of the positioner is preferably in the form of a one-piece casting and, as hereinafter described more in detail, carries the work supporting table 8 so that it is rotatable about its center. It is disposed between the upper or outer ends of the arms 12 of the bracket 6 and has the apex part thereof connected pivotally to the upper extremities of the arms by way of a horizontally extending stub axle 16. The latter extends through aligned holes 17 and 18 in the apex portion of the member 7 and the upper ends of the arms 12 and permits the member, together with the table, to be tilted bodily into different angular positions.

The table 8 is adapted to carry or support the work and has a plurality of holes 19 therein whereby the work may be removably fixed to it by way of bolts or other attaching devices (not shown). It is preferably flat and rectangular and has a gear wheel 20 fixedly secured to the central portion of its under face. A shaft and bearing connection 21 extends between, and serves to connect, the table 8 and sector shaped member 7 and constitutes a mounting or support whereby the table is permitted to rotate bodily about the center thereof. This connection 21 consists of a stub shaft 22 and a pair of bearings 23. The bearings are spaced apart axially, as shown in Figure 2, and are formed in and as integral parts of the member 7. One end of the shaft 22 fits within and is suitably secured to a hub 24 at the center of the gear wheel. Such hub, as shown in Figure 2, is an integral part of the gear wheel and is centrally positioned with respect to the table 8. The other end of the shaft 22 fits and is journaled in the bearings 23. A collar 25 is disposed between the two bearings 23 and is mounted on and fixed to the shaft 22. This collar co-acts with the hub 24 of the gear wheel 20 to hold the shaft 22 against axial displacement with respect to the sector shaped member 7. Because of the shaft and bearing connection 21 between the table 8 and the member 7 the table is capable of rotating relatively to the member and is caused to tilt or swing with the member 7 when the latter is tilted or swung with respect to the bracket 6 of the positioner. The two bearings 23 of the connection 21 are located in the central portion of the sector shaped member 7.

In addition to the base, bracket, member and table the positioner comprises gearing 26 for tilting the member 7 and the table 8 relatively to the bracket 6 and gearing 27 for rotating the table relatively to the sector shaped member 7.

The gearing 26 comprises a worm 28, a worm wheel 29 and a pinion 30. The worm 28 of the gearing 26 is mounted on one end of a horizontally extending shaft 31. The latter, as shown in Figures 1 and 2, is journaled in a bearing 32 at one side of the sleeve part 11 of the bracket 6, and carries at its other end a hand wheel 33. The bearing 32 is fixed to the sleeve part 11 by way of a pair of arms 34 and is horizontally elongated. The hand wheel 33 is keyed or otherwise fixedly secured to the shaft 31 and is adapted to be turned when it is desired to set into operation the gearing 26 in order to tilt the member 7 and the table 8. Suitable collars are fixed to the shaft 31 in such manner that they abut against the ends of the bearing 32 and hold the shaft and worm 28 against axial displacement. The hand wheel 33 may if desired be replaced by an electric motor. The worm wheel 29 meshes with the worm 28 and is driven by the latter when the shaft 31 is turned or rotated. It is disposed above the worm 28 and is fixedly connected to one end of a shaft 35. The latter extends horizontally and is journaled in a pair of bearings 36. These bearings are located at and formed integrally with the inner or lower ends of the arms 12 of the bracket 6 and are located slightly above and to one side of the sleeve part 11. A suitable collar arrangement is employed so as to hold the shaft 35 against axial displacement with respect to the bearings 36. The pinion 30 is mounted on, and fixed to, the central portion of the shaft 35, and meshes with an arcuate series of teeth 37 on the periphery of the sector shaped member 7. When the shaft 31 is turned in one direction the gearing 26 operates to tilt the member 7 and the table 8 in one direction and when the shaft 31 is reversibly rotated or turned the gearing operates to tilt the member and table in the opposite or reverse direction. Because of the worm 28 and worm wheel 29 the gearing 26 is irreversible and the table will remain in any tilted position until such position is changed by manipulation of the gearing 26. The teeth 37 preferably extend throughout an arc of approximately 135° and are so arranged that when the table 8 is in a truly horizontal position, as shown in Figure 2, the pinion 30 of the gearing 26 is in mesh with the teeth 37 at one end of the series. Due to the position of the pinion and because of the arrangement of the teeth 37 and the fact that such teeth extend throughout 135° the table 8 is capable of being swung by manipulation of the gearing 36 from a horizontal position to a position 135° from such horizontal position. The gearing arrangement is such that when the table is in its horizontal position and the gearing 26 is driven for table tilting purposes the table tilts away from the standard 9. When the table is in its full tilted position, as shown in dotted lines in Figure 2, it extends substantially parallel to the arms 12 of the bracket 6 and is in such a partially inverted position that the work which is secured thereto may be welded on the bottom or under side. The end teeth at the ends of the arcuate series of teeth 37 are enlarged so as to form stops for limiting the swinging or tilting of the member 7 and the table 8 to a 135° arc.

The gearing 27 for turning or rotating the table 8 relatively to the sector shaped member 7 comprises a worm 38, a worm wheel 39 and a pinion 40. The worm 38 is disposed in a chamber 41 in one end of the member 7 and is keyed or otherwise fixedly secured to one end of the horizontal extending shaft 42. The shaft, as shown in Figures 3 and 4, is journaled in a horizontally elongated bearing 43 at one side of the member 7. At its other or outer end the shaft 42 is provided with a hand wheel 44 for turning purposes. An electric motor may, if desired, be substituted for or used in lieu of the hand wheel. The worm 38 is normally in mesh with the worm wheel 39 and operates, when in mesh with the worm wheel and in connection with rotation or drive of the shaft 42 by turning of the hand wheel 44, to rotate the worm wheel. The latter is disposed in the chamber 41 and is fixedly secured to one end of a shaft 45. As shown in Figure 4 of the drawings, this shaft 45 is journaled in a bearing 46 at one end of the sector shaped member 7 and carries at its other end the pinion 40. The latter meshes with the gear wheel 20 on the central portion of the under side of the table 8 and operates in response to drive of the gearing 27 and through the medium of the gear wheel 20 to rotate the table 8 relatively to the member 7. When the gearing 27 is driven in one direction the table 8 is caused to rotate in one direction and when the gearing is reversibly driven the table 8 is rotated in the opposite or reverse direction. Because of the worm 38 and the worm wheel 39 the gearing 27 is of the irreversible variety and hence when the gearing is operative or effective the table 8 cannot be rotated except through the medium of the gearing. The worm 38 when it is in its normal position, i. e., when it is in mesh with the worm gear 39 abuts against the inner end of the bearing 43. A collar 47 is releasably secured to the outer end of the shaft 42 by a bolt 48 and is adapted, when fixed in place by the bolt, to abut against the outer end of the bearing 43 and coact with the worm 38 in holding the shaft 42 against axial displacement. When the collar 47 is released by removal of the bolt 48 and the shaft 42 is turned in one particular direction the worm 38 feeds or turns itself out of mesh with the worm gear 39 and urges the shaft 42 inwards, as shown in Figure 3. When the shaft is shifted inwards in this manner and the worm 38 is out of mesh with the worm gear the gearing 27 is inoperative or ineffective with the result that the table 8 is free to be rotated manually, i. e., independently of the gearing. When the shaft 42 is urged outwards and is turned in the reverse or opposite direction the worm 38 feeds itself into mesh with the worm wheel 39, as shown in dotted lines in Figure 3. When the worm is in mesh with the worm gear and the collar 47 is locked in place by means of the bolt 48 the gearing 27 is again adapted to rotate the table upon turning of the shaft 42. The chamber 41 is closed by removable plates 49 and the latter are so arranged that when they are removed access may be had to the worm 38 and the worm gear 39 in the chamber 41.

When the positioner is to be used the work is placed upon the top face of the table 8 and is bolted or clamped in place. If it is desired to rotate the work during welding thereof the table 8 is rotated in one direction or the other by manipulation of the gearing 27. Should it be desired to render the gearing 27 inoperative or ineffective in order to permit of manual turning or rotation of the table 8 it is only necessary to release the collar 47 and then, by proper turning of the shaft 42, disengage the worm 28 from the worm gear 29. When the worm is disengaged from, or out of mesh with, the worm gear 39 the table 8 is free and hence may be manually rotated. To render the gearing 27 operative or effective the worm 38 is brought into mesh with the worm gear 39 by turning of the shaft 42 and then the shaft is locked in place by securing the collar 47 to the shaft by way of the bolt 48. Should it be desired to hold the work at an angle it is only necessary to operate the gearing 26 by manipulation of the hand wheel 33. By turning the hand wheel as far as possible in one direction the table 8, together with the work, may be tilted 135° from the horizontal. When fully tilted the table and work are in a partially inverted position as heretofore pointed out and it is possible to weld the bottom parts of the work.

The herein described work positioner effectively and efficiently fulfills its intended purpose and may be manufactured or produced at a comparatively low or reasonable cost. It is compact and permits of quick or ready adjustment of the position of the work. By having one of the gears of the gearing 27 arranged so that it may be disengaged from the gear with which it normally meshes such gearing 27 may be quickly and readily rendered ineffective in instances or cases where the operator or user of the positioner desires manually to rotate the table and work.

The invention is not to be understood as restricted to the details set forth since these may be modified within the scope of the appended claims without departing from the spirit and scope of the invention.

Having thus described the invention what I claim as new and desire to secure by Letters Patent is:

1. A work positioner adapted for use in connection with welding and comprising a base with a bracket thereon, a member connected pivotally to the bracket so that it is capable of being tilted in a vertical plane, a work supporting table connected to the member so that it is rotatable about its center, irreversible gearing between the member and table for rotating the table relatively to said member, and means for readily rendering said gearing inoperative so as to release or free the table for manual rotation.

2. A work positioner of the character described comprising a base with a bracket thereon, a member connected pivotally to the the bracket so that it is capable of being tilted in a vertical plane, a work supporting table connected to the member so that it is rotatable about its center, irreversible gearing between the member and the table for rotating the table relatively to said member, including a pair of normally meshing gears, and means whereby one of the gears may be readily disengaged from the other so as to render the gearing inoperative and thus free or release the table for manual rotation.

3. A work positioner comprising a base with a bracket thereon, a member connected pivotally to the bracket so that it is capable of being tilted in a vertical plane, a work supporting table connected to the member so that it is rotatable about its center, irreversible gearing between the member and the table for rotating the table relatively to the member, including a worm and a worm gear normally in mesh with the worm, and means whereby the worm may be readily disengaged from the worm gear in order to render the gearing inoperative and thus free or release the table for manual rotation.

4. A work positioner comprising a base, a bracket carried by the base and embodying a pair of laterally spaced parallel arms extending upwardly and outwardly at an acute angle with respect to the horizontal, a sector shaped member disposed between the arms and having the apex or hub part thereof pivotally connected to the upper extremities of said arms so that it is adapted to tilt in a vertical plane, a work supporting table connected to the member so that it is rotatable about its center, gearing for tilting the member and table, including a pinion disposed between the lower or inner ends of the arms, and an arcuate series of teeth on the periphery of the member and in mesh with said pinion, irreversible gearing between the member and the table for rotating the table relatively to the member, and means for readily rendering the last mentioned gearing inoperative so as to free or release the table for manual rotation.

5. A work positioner comprising a base, a bracket carried by the base and embodying an outwardly and upwardly extending arm, a sector shaped member embodying a chamber therein and having the apex or hub part thereof connected pivotally to the upper extremity of said arm so that it is capable of being tilted in a vertical plane, a work supporting table connected to the member so that it is rotatable about its center, gearing for tilting the member and table, including a pinion adjacent the lower end of the arm, and an arcuate series of teeth on the periphery of the member and in mesh with the pinion, irreversible gearing for rotating the table relatively to the member, including a pair of normally meshing gears in said chamber, and means whereby one of the gears may be readily disengaged from the other gear in order to render the last mentioned gearing inoperative and thus free the table for manual rotation.

6. A work positioner adapted for use in connection with welding and comprising a base with a bracket thereon, a member embodying a bearing and connected pivotally to the bracket so that it is capable of being tilted in a vertical plane, a work supporting and retaining table connected to the member so that it is rotatable about its center, irreversible gearing between the member and the table for rotating the table relatively to the member including a drive shaft journalled in the bearing of said member, a worm fixed to the shaft and a worm gear operatively connected to the table and adapted to be driven by the worm in connection with drive of the shaft, said shaft being axially slidable in said bearing so that the worm may be shifted out of engagement with the worm gear when it is desired to render the gearing inoperative and free the table for manual rotation, and releasable means associated with said shaft and adapted to hold the latter against axial displacement when the worm is shifted into engagement with the worm gear.

GEORGE C. MUELLER.